UNITED STATES PATENT OFFICE 2,570,029

ALLYL ESTERS OF 3:6-ENDOXO-1:2-CYCLO-HEXANE-DICARBOXYLIC ACID AND POLYMERS THEREOF

Maurice Louis Auguste Fluchaire and Georges Collardeau, Lyon, France, assignors to Societe des Usines Chimiques Rhone-Poulenc, Paris, France, a French body corporate No Drawing. Application October 28, 1949, Serial No. 124,262. In France November 6, 1948

10 Claims. (Cl. 260—78.4)

This invention relates to new polymerisable substances and polymers obtained therefrom.

Since the publication of Kronstein's U. S. Patent No. 843,401 various patents have been obtained for the polymerisation, under the action of suitable agents, of esters of polyacids having at least two of their acid groups esterified by an allyl-alcohol.

It is an object of this invention to provide new polymerisable materials and it is a further object to provide polymers therefrom which are fusible and soluble in organic solvents. A further object is to provide polymers which are infusible and insoluble in organic solvents. A still further object is to provide processes for the production of such polymers to provide processes for the production of shaped objects and layers of such polymers and to provide a method of producing plywood in which the layers of wood are adhered together by such polymers. Further objects will hereinafter appear.

It has now been found, and this forms the basis of the present invention, that the diesters of the various isomers of 3:6-endoxo-1:2-cyclohexanedicarboxylic acid with an alcohol of the general formula $CH_2=CH-CH_2OH$, where R is a hydrogen atom, a halogen atom or a hydrocarbon group (hereafter referred to for brevity as allyl-type alcohols), which esters are hitherto unknown compounds can be polymerised to yield in the first place fusible polymers which are soluble in one or more of the usual organic solvents, and secondly, infusible resins which are insoluble in all the usual solvents and can be used for various industrial purposes.

The acids of which the diesters form the subject of the present invention are more precisely the various isomers of acids of the type:

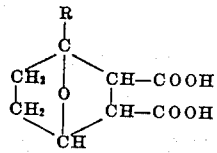

in which R represents hydrogen or a saturated hydrocarbon radical, such as a methyl or ethyl radical.

It is known that the anyhydrides of such acids may be obtained, for example, by condensing furan or α-substituted furans with maleic anhydride and hydrogenating the condensation product obtained.

Examples of allyl-type alcohols which may be employed are allyl alcohol itself, β-chlorallyl alcohol and β-methylallyl alcohol.

The diesters of 3:6-endoxo-1:2-cyclohexane-dicarboxylic acids with an allyl-type alcohol can be prepared by the methods usually employed in the preparation of esters, for example by the action of the acid, or the anhydride or chloride thereof, on the allyl-type alcohol, or by double decomposition between an ester of 3:6-endoxo-1:2-cyclohexanedicarboxylic acid and an allyl-type or by the action of an alkali salt of the acid on a halogenated derivative of the allyl-type alcohol.

In the particular case of β-methylallyl alcohol, it is known that it is difficult to prepare the esters thereof, since this alcohol is readily decomposed, for example under the action of the mineral acids employed as esterification catalysts. The 3:6-endoxo-1:2-cyclohexanedicarboxylic acids may be esterified by β-methylallyl alcohol in the presence of sodium silicate by the method described in U. S. Patent No. 2,411,136, but it is also possible to carry out the operation without a catalyst, provided that a sufficiently high temperature (about 180° C.) is maintained. The reaction medium may be maintained at this temperature by gradually adding the alcohol to the heated acid.

The 3:6-endoxo - 1:2 - cyclohexanedicarboxylates of allyl-type alcohols are colourless liquids or colourless solids having a fairly low melting point, which can generally be distilled under reduced pressure.

Such compounds may be polymerised by heating them in the presence or absence of air, and preferably in the presence of a catalyst. This catalyst may be a peroxide, for example an organic peroxide such as benzoyl peroxide, acetyl peroxide, acetone peroxide or tetraline peroxide, or by a resinate, naphthenate or linoleate of cobalt, manganese or lead. A polymerisation temperature of between 35° C. and 160° C. is preferably employed, the quantity of catalyst generally varying between 1% and 5% of the weight of the ester to be polymerised. It is to be understood, however, that the foregoing do not represent absolute limits in regard to the temperature and the quantity of catalyst to be employed.

If the polymerisation is interrupted (by discontinuing the heating) before the infusible polymers, insoluble in all the usual organic solvents, are obtained, less highly condensed products are obtained, which are fusible and still soluble in one or more solvents. These products which are herein referred to as prepolymers form only very slowly at room temperature. They may be shaped as desired, for example by moulding, and they may be converted in shaped form to infusible polymers by subjecting them to further heating.

The polymerisation may be carried out with the esters carried on a support, such as paper, woven fabric, cardboard, wood or glass fibre. Coloured or colourless pigments, loading substances and other adjuvants may also be incorporated in the 3:6-endoxo-1:2-hexahydrophthalic esters before or during the polymerisation. Moreover, other polymerisable compounds may be included to form copolymers.

The infusible polymers obtained in accordance with the present invention are transparent and colourless or slightly coloured. They are only slightly hygroscopic, are resistant to relatively high temperatures and are excellent electric insulators. They are more flexible than glass and can readily be worked, for example, they may be sawn, filed, drilled or turned.

These valuable properties, coupled with the fact that they may be moulded to the required form, enable them to be employed for many purposes, for example as insulators in the electrical industries, as transparent moulded or machined receptacles capable of resisting solvents and therefore suitable for use as such in the chemical and associated industries and in the fuel industry, as decorative articles, and as binders, for example as binders for agglomerating abrasive powders.

The soluble prepolymers may be employed as adhesives for various materials. Thus, plywood can be produced therewith, by clamping together pieces of wood impregnated with the prepolymers and then completing the polymerisation. The solutions of prepolymers may be applied to various materials, such as metal surfaces (for example aluminum). By evaporating the solvent and completing the polymerisation, flexible and adherent varnishes are thus obtained. By introducing loading substances or pigments into the solutions of prepolymers, variously coloured varnishes can be obtained.

The following examples, in which the parts are by weight, will serve to illustrate the invention but are not to be regarded as limiting it in any way:

Example I

Into a distillation apparatus are introduced 60 parts of 3:6-endoxo-1:2-cyclohexanedicarboxylic anhydride, 100 parts of allyl alcohol, 50 parts of benzene and 4 parts of benzenesulphonic acid and the mixture is distilled. The lower aqueous layer is separated from the distillate while the upper layer is returned into the apparatus. When it is substantially impossible to decant any more water, the product of the reaction is neutralised with sodium carbonate, the excess of alcohol and the benzene are distilled off and the residual ester is washed with water and then dried over calcium chloride. This ester distils at 169–170° C. under a pressure of 2 mm. of mercury. On cooling at 36.5° C., it crystallises in the form of colourless crystals. $d_4^{40}=1.143$. Yield: 69% of the theory.

When heated in a closed vessel with 5% of benzoyl peroxide at 75° C., the ester sets in the form of a gel in 3½ hours, and when heated for 24 hours it sets into a hard mass, which is slightly coloured, transparent and insoluble in the usual solvents. $d_4^{40}=1.292$.

Example II

The procedure described in Example I is followed, but the 3:6-endoxo-1:2 cyclohexanedicarboxylic anhydride is replaced by 3-methyl-3:6-endoxo-1:2-cyclohexanedicarboxylic anhydride. The ester obtained distils at a temperature between 172° and 177° C. under 5 mm. of mercury, and solidifies at 41.7° C. in the form of colourless crystals ($d_4^{50}=1.104$).

The yield is of the same order as in the previous example.

When heated in a closed vessel at 75° C. with 5% of benzoyl peroxide, this ester sets in gel form in 3 hours and is converted in 24 hours into a hard transparent mass which has little colouring and is insoluble in the usual solvents. $d_4^{50}=1.241$.

When heated in a closed vessel at 135° C. with 5% of acetone peroxide, the ester sets in gel form in 3¼ hours and is converted in 20 hours into a hard, colourless, transparent mass which is insoluble in the usual solvents.

Example III

Into a distillation apparatus are introduced 25 parts of 3:6-endoxo-1:2-cyclohexanedicarboxylic anhydride and 8 parts of β-methylallyl alcohol. The mixture is distilled, the lower aqueous layer being separated, while the upper layer is returned into the apparatus. 23 parts of methylallyl alcohol are gradually introduced into the apparatus so as to maintain the reaction mass at a temperature in the neighbourhood of 180° C. When distilled at 157–160° C. under a pressure of 3 mm. of mercury, the product of the reaction is a colourless liquid ($n_D^{20}=1.4830$; $d_4^{25}=1.104$). Yield: 65%.

When heated at 75° C. with 5% of benzoyl peroxide, this ester sets in gel form in 3½ hours and is converted in 10 hours into a hard, transparent, colourless mass which is insoluble in the usual solvents. $d_4^{25}=1.230$.

Example IV

In an apparatus fitted with a vertical condenser with a cooling agent rising therein, 10 parts of the monomeric ester obtained as described in Example I, 8.7 parts of benzene and 0.5 part of benzoyl peroxide are heated until the viscosity of the mixture is three times as high as the initial viscosity. The heating is stopped and the product of the reaction is run into 120 parts of methanol while being agitated. A white polymer precipitates, which is washed with 40 parts of methanol and dried in vacuo. This dry polymer is a pulverous product soluble in chloroform, in the molten monomer and in diallyl phthalate.

When heated for 5 minutes at 250° C. under pressure in a mould, it is converted into a mass insoluble in the usual solvents.

We claim:

1. A diester of 3:6-endoxo-1:2-cyclohexanedicarboxylic acid formed with an alcohol of the general formula CH$_2$=CR—CH$_2$OH where R is selected from the class consisting of the hydrogen atom, halogen atom and hydrocarbon group.

2. The di-allyl ester of 3:6-endoxo-1:2-cyclohexane-dicarboxylic acid.

3. The di-β-methylallyl ester of 3:6-endoxo-1:2-cyclohexane-dicarboxylic acid.

4. A process for the production of a polymer which comprises subjecting to heat treatment a diester of 3:6-endoxo-1:2-cyclohexane-dicarboxylic acid formed with an alcohol of the general formula CH$_2$=CR—CH$_2$OH where R is selected from the class consisting of the hydrogen atom, halogen atoms and hydrocarbon groups, and discontinuing the heat treatment when the reaction product is in the form of a fusible solid polymer soluble in organic solvents.

5. A process for the production of a polymer which comprises subjecting to heat treatment a diester of 3:6-endoxo-1:2-cyclohexane-dicarboxylic acid formed with an alcohol of the general formula $CH_2=CR-CH_2OH$ where R is selected from the class consisting of the hydrogen atom, halogen atoms and hydrocarbon groups, and continuing the heat treatment until an insoluble infusible product is obtained.

6. A process for the production of a polymer which comprises subjecting to heat treatment a diester of 3:6-endoxo-1:2-cyclohexane-dicarboxylic acid formed with an alcohol of the general formula $CH_2=CR-CH_2OH$ where R is selected from the class consisting of the hydrogen atom, halogen atoms and hydrocarbon groups, discontinuing the heat treatment when the reaction product is in the form of a fusible solid polymer soluble in organic solvents, shaping the said polymer and thereafter subjecting it to further heat treatment to convert it to an infusible, insoluble form.

7. A process for the production of a polymer which comprises subjecting to heat treatment, in the presence of an organic peroxide, a diester of 3:6 - endoxo - 1:2 - cyclohexane - dicarboxylic acid formed with an alcohol of the general formula $CH_2=CR-CH_2OH$ where R is selected from the class consisting of the hydrogen atom, halogen atoms and hydrocarbon groups, discontinuing the heat treatment when the reaction product is in the form of a fusible solid polymer soluble in organic solvents, shaping the said polymer and thereafter subjecting it to further heat treatment to convert it to an infusible, insoluble form.

8. A process for the production of a polymer which comprises subjecting to heat treatment, at a temperature of 35° C. to 160° C. a diester of 3:6 - endoxo - 1:2 - cyclohexane - dicarboxylic acid formed with an alcohol of the general formula $CH_2=CR-CH_2OH$ where R is selected from the class consisting of the hydrogen atom, halogen atoms and hydrocarbon groups, and discontinuing the heat treatment when the reaction product is in the form of a fusible solid polymer soluble in organic solvents.

9. A process for the production of a polymer which comprises subjecting to heat treatment, in the presence of 1 to 5% of an organic peroxide, a diester of 3:6-endoxo-1:2-cyclohexane-dicarboxylic acid formed with an alcohol of the general formula $CH_2=CR-CH_2OH$ where R is selected from the class consisting of the hydrogen atom, halogen atoms and hydrocarbon groups, and discontinuing the heat treatment when the reaction product is in the form of a fusible solid polymer soluble in organic solvents.

10. A process for the production of a polymer which comprises subjecting to heat treatment, in the substantial absence of air, a diester of 3:6-endoxo-1:2-cyclohexane-dicarboxylic acid formed with an alcohol of the general formula $$CH_2=CR-CH_2OH$$

where R is selected from the class consisting of the hydrogen atom, halogen atoms and hydrocarbon groups, and discontinuing the heat treatment when the reaction product is in the form of a fusible solid polymer soluble in organic solvents.

MAURICE LOUIS AUGUSTE
FLUCHAIRE.
GEORGES COLLARDEAU.

REFERENCES CITED

The following references are of record in the file of this patent:

UNITED STATES PATENTS

| Number | Name | Date |
|---|---|---|
| 2,218,439 | Rothrock | Oct. 15, 1940 |
| 2,273,891 | Pollack et al. | Feb. 24, 1942 |
| 2,437,962 | Kropa | Mar. 16, 1948 |
| 2,471,790 | Sowa | May 31, 1949 |